(12) United States Patent
Rau et al.

(10) Patent No.: US 8,600,367 B2
(45) Date of Patent: Dec. 3, 2013

(54) HANDS-FREE TELEPHONE DEVICE OF A MOTOR VEHICLE

(71) Applicant: Bayerische Motoren Werke Aktiengesellschaft, Munich (DE)

(72) Inventors: Richard Rau, Dachau (DE); Peter Schramm, Eching (DE); Martin Arend, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/665,102

(22) Filed: Oct. 31, 2012

(65) Prior Publication Data

US 2013/0053016 A1   Feb. 28, 2013

Related U.S. Application Data

(63) Continuation of application No. PCT/EP2011/055980, filed on Apr. 15, 2011.

(30) Foreign Application Priority Data

Apr. 30, 2010   (DE) .......................... 10 2010 028 449

(51) Int. Cl.
   *H04M 3/00* (2006.01)
(52) U.S. Cl.
   USPC ............... 455/418; 455/456.2; 455/456.1; 455/453; 455/507; 455/501; 455/423; 455/509; 455/452.1
(58) Field of Classification Search
   USPC ............ 455/456.2, 456.1, 452.1, 453, 507, 9, 455/513, 501, 509, 426.1, 457, 418, 411, 455/41.2, 569.2, 414.1
   See application file for complete search history.

(56) References Cited

U.S. PATENT DOCUMENTS

| | | | |
|---|---|---|---|
| 2004/0052356 A1 | 3/2004 | McKenzie et al. | |
| 2006/0089176 A1* | 4/2006 | Oki | 455/569.1 |
| 2006/0229014 A1* | 10/2006 | Harada et al. | 455/41.2 |
| 2007/0019362 A1 | 1/2007 | Stevenson et al. | |
| 2007/0140187 A1* | 6/2007 | Rokusek et al. | 370/338 |

(Continued)

FOREIGN PATENT DOCUMENTS

| | | |
|---|---|---|
| DE | 10 2006 010 611 A1 | 9/2007 |
| DE | 10 2007 047 374 A1 | 4/2008 |

(Continued)

OTHER PUBLICATIONS

Machine translation of the WO 2009/060612.*

(Continued)

*Primary Examiner* — Joseph Arevalo
(74) *Attorney, Agent, or Firm* — Crowell & Moring LLP

(57) ABSTRACT

A motor vehicle hands-free device includes a communication interface designed so that at least one first mobile telephone and one second mobile telephone can be connected to the motor vehicle hands-free device, in particular in parallel or simultaneously, a control device designed so that mobile telephone address book entries from the first mobile telephone and mobile telephone address book entries from the second mobile telephone can be transferred to the motor vehicle hands-free device via the radio interface, and a common address book that can be generated on the basis of the mobile telephone address book entries of the first mobile telephone and the mobile telephone address book entries of the second mobile telephone.

14 Claims, 1 Drawing Sheet

(56) References Cited

U.S. PATENT DOCUMENTS

| | | | |
|---|---|---|---|
| 2008/0045274 A1* | 2/2008 | Witkowski et al. | 455/569.2 |
| 2008/0085745 A1 | 4/2008 | Ozaki | |
| 2008/0200217 A1 | 8/2008 | Venhofen et al. | |
| 2009/0181653 A1* | 7/2009 | Alharayeri | 455/414.1 |
| 2009/0209297 A1 | 8/2009 | Suzuki | |
| 2009/0209298 A1* | 8/2009 | Abeta et al. | 455/569.2 |
| 2009/0253466 A1 | 10/2009 | Saito et al. | |
| 2009/0253467 A1 | 10/2009 | Saito | |
| 2009/0280746 A1 | 11/2009 | Sykora et al. | |
| 2010/0070637 A1* | 3/2010 | Saito et al. | 709/228 |
| 2010/0120366 A1* | 5/2010 | DeBiasio et al. | 455/41.3 |
| 2010/0144401 A1* | 6/2010 | Azuma | 455/569.2 |
| 2010/0178873 A1* | 7/2010 | Lee et al. | 455/41.3 |
| 2010/0197362 A1* | 8/2010 | Saitoh et al. | 455/569.2 |
| 2010/0274859 A1* | 10/2010 | Bucuk | 709/206 |
| 2010/0295803 A1* | 11/2010 | Kim et al. | 345/173 |
| 2010/0304674 A1* | 12/2010 | Kim et al. | 455/41.2 |
| 2011/0070827 A1* | 3/2011 | Griffin et al. | 455/41.1 |
| 2011/0177802 A1* | 7/2011 | Gupta | 455/418 |

FOREIGN PATENT DOCUMENTS

| | | | |
|---|---|---|---|
| DE | 10 2006 055 501 A1 | 5/2008 | |
| DE | 10 2008 007 868 A1 | 8/2008 | |
| DE | 10 2009 009 694 A1 | 8/2009 | |
| DE | 10 2009 009 696 A1 | 8/2009 | |
| DE | 10 2009 016 012 A1 | 10/2009 | |
| DE | 10 2009 015 997 A1 | 1/2010 | |
| WO | WO 2009/060612 * | 5/2009 | H04M 1/56 |

OTHER PUBLICATIONS

International Preliminary Report on Patentability (PCT/IB/373) dated Nov. 6, 2012 (one (1) page).

Written Opinion (PCT/ISA/237) dated Jul. 25, 2011 (six (6) pages).

International Search Report dated Jul. 25, 2011 including English-language translation (Four (4) pages).

German Search Report dated Apr. 15, 2011 including partial English-language translation (Nine (9) pages).

* cited by examiner

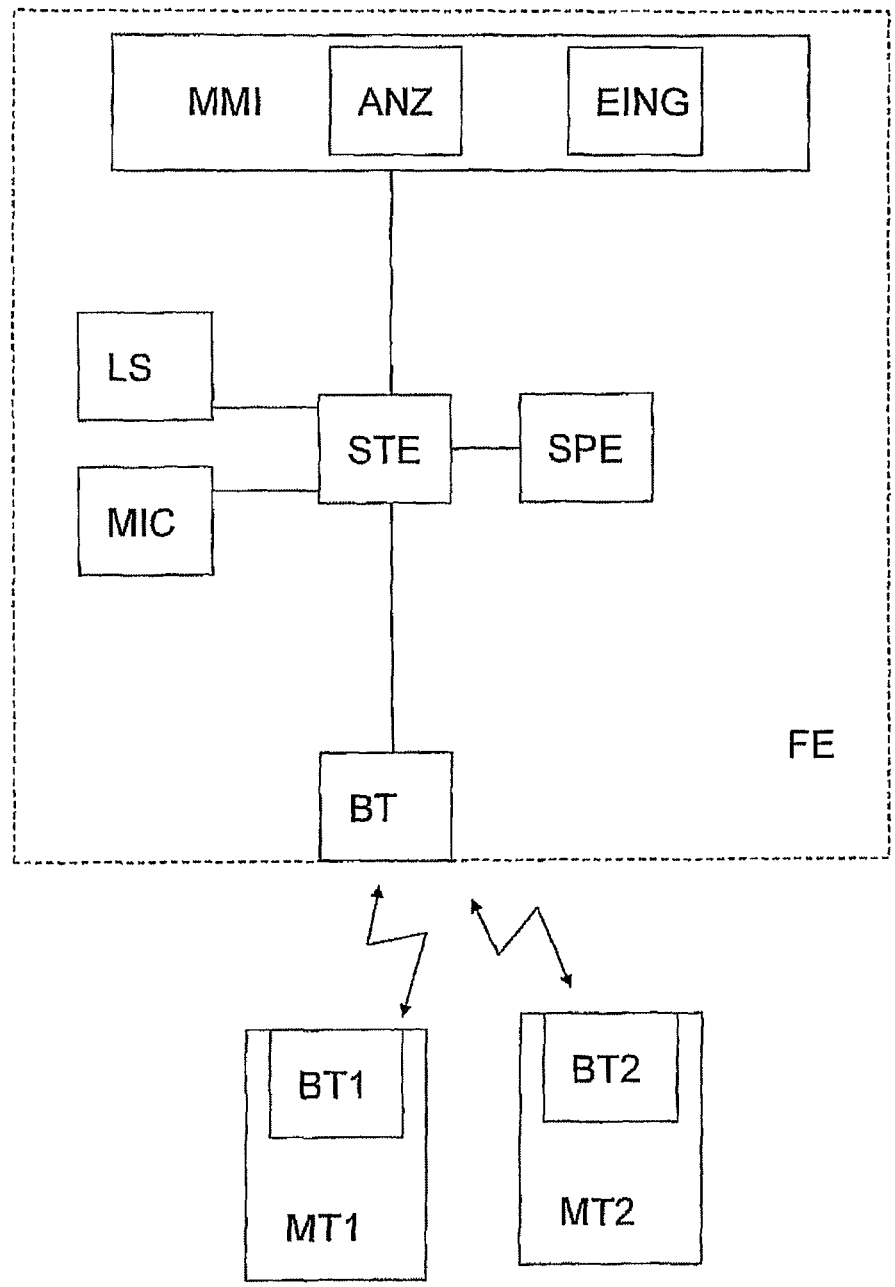

1

HANDS-FREE TELEPHONE DEVICE OF A MOTOR VEHICLE

CROSS-REFERENCE TO RELATED APPLICATIONS

This application is a continuation of PCT International Application No. PCT/EP2011/055980, filed Apr. 15, 2011, which claims priority under 35 U.S.C. §119 from German Patent Application No. DE 2010 028 449.1, filed Apr. 30, 2010, the entire disclosures of which are herein expressly incorporated by reference.

BACKGROUND AND SUMMARY OF THE INVENTION

The invention relates to a hands-free telephone device of a motor vehicle.

In recent years the continued rapid spread of mobile communication technology has resulted in, among other things, the development and availability of hands-free telephone devices that are configured for motor vehicles and interact with mobile telephones. In this case the hands-free telephone devices that are configured for motor vehicles and that are considered to be particularly advanced are those that interact and communicate with a mobile telephone, which may be found, in particular, in the vehicle or in close proximity to the vehicle, in a wireless manner, in particular, on the basis of the so-called Bluetooth standard.

For this purpose it is known that a hands-free telephone device of a motor vehicle automatically establishes a Bluetooth connection to a mobile telephone, which is assigned to the hands-free telephone device of the motor vehicle, or vice versa, as soon as the mobile telephone is within the range of the hands-free telephone device of the motor vehicle, and vice versa. Then, the mobile telephone and the hands-free telephone device of the motor vehicle can exchange data by way of the Bluetooth connection. Then, the exchange of voice data allows the voice communication, based on the hands-free telephone device of the motor vehicle and the mobile telephone, to be implemented by way of a mobile communication system. The exchange of control data allows the control of the mobile telephone to be implemented by way of a user interface of a motor vehicle.

An object of the present invention is to provide a means by which two mobile telephones can be comfortably operated by way of one hands-free telephone device of a motor vehicle.

This and other objects are achieved by a hands-free telephone device of a motor vehicle comprising a communication interface, which is configured such that at least a first mobile telephone and a second mobile telephone are connectable, in particular in parallel or simultaneously, to the hands-free telephone device of the motor vehicle; and a control unit, which is configured such that the mobile telephone address book entries from the first mobile telephone and the mobile telephone address book entries from the second mobile telephone are transferrable to the hands-free telephone device of the motor vehicle by way of the communication interface. A common address book of the hands-free telephone device of a motor vehicle can be generated on the basis of the mobile telephone address book entries of the first mobile telephone and on the basis of the mobile telephone address book entries of the second mobile telephone.

According to the invention, the hands-free telephone device of the motor vehicle includes a communication interface, such as a Bluetooth interface, which is configured in such a way that at least a first mobile telephone and a second mobile telephone can be connected or are connected, in particular in parallel or simultaneously, to the hands-free telephone device of the motor vehicle.

In this context, the term "connected" means preferably that a connection is actually established and/or that data items are actually transferred, in particular, that the mobile telephones are considered to be "connected" to the hands-free telephone device of the motor vehicle in the sense of the Bluetooth specification. A connection is possible preferably only with mobile telephones that have been previously coupled or "paired" with the hands-free telephone device of a motor vehicle.

In addition, a control unit is provided. This control unit is configured in such a way that the mobile telephone address book entries from the first mobile telephone, for example, from a memory unit of a subscriber identity module (SIM) and/or from a memory unit of a telephone, and the mobile telephone address book entries from the second mobile telephone can be transferred or are transferred to the hands-free telephone device of the motor vehicle by way of the communication interface.

A common, in particular combined, address book of the hands-free telephone device of a motor vehicle can be generated or a common address book of the hands-free telephone device of a motor vehicle is generated on the basis of the mobile telephone address book entries of the first mobile telephone and on the basis of the mobile telephone address book entries of the second mobile telephone. In this context, the term "address book" also includes the concept "telephone book."

This arrangement allows a user of a hands-free telephone device of a motor vehicle to access the entries of the mobile telephone address book of two mobile telephones in a simple, reliable and convenient way during a trip without the user having to take his eyes off of the surrounding traffic situation.

Preferably, the address book of a hands-free telephone device of a motor vehicle can be stored in a memory unit of the hands-free telephone device of a motor vehicle and/or can be output totally or partially to a display unit that is coupled to the hands-free telephone device of a motor vehicle.

In a further development of the invention an identity tag (host ID), which is assigned to the address book entries and which is provided for the mobile telephone (host mobile telephone), from which the address book entry or entries originate, can be transferred to the hands-free telephone device of the motor vehicle. The identity tag or an information item derived from the identity tag can be stored together with the related address book entry or entries in the memory unit of the hands-free telephone device of the motor vehicle and/or can be output together with the related address book entry or entries to the display unit that is coupled with the hands-free telephone device of the motor vehicle.

As an alternative or in addition to this further development, it can be provided that an identity tag, which is generated by the hands-free telephone device of the motor vehicle, is assigned to the address book entries, originating from a specific mobile telephone, by way of the hands-free telephone device of the motor vehicle.

This arrangement allows the hands-free telephone device of the motor vehicle to have available information about the host providers of the address book entries. In addition, a user can recognize the host provider (the first or the second mobile telephone) of the various address book entries.

In a further development of the invention the address book entries of the common address book of the hands-free telephone device of the motor vehicle can be jointly sorted, for example, alphabetically, according to the host ID or the access frequency, or can be jointly filtered, for example, according to the host ID or the type of address book entry (private, business, etc.). This feature enhances the aforementioned advantages.

It is an advantageous embodiment of the invention that not only the address book entries of the mobile telephone, but also messages, calendar entries, tasks and/or memos from the mobile telephones can be transferred to the hands-free telephone device of the motor vehicle by way of the communication interface, and that a common, in particular combined, message list, a common calendar, a common to-do list, and/or a common memo list can be generated on the basis of the transferred messages, calendar entries, tasks and/or memos. Further developments of this embodiment analogous to the aforementioned further developments of the alternative address books as well as the further developments of the alternative address books described below are also within the scope of the invention.

It is also a further development of the invention that a call setup can be carried out or is carried out automatically by way of the mobile telephone having an identity tag that is assigned to a selected address book entry. The selection of an address book entry is performed, for example, by use of an input unit that is assigned to the hands-free telephone device of the motor vehicle. As an alternative to this further development, it can be provided that a user selects manually the connected mobile telephone that is to be used for setting up a call to a call number of a selected address book entry of the common address book of the hands-free telephone device of the motor vehicle.

Another embodiment provides that when initiated by the user (for example, in reaction to a corresponding user input to an input unit coupled with the hands-free telephone device of the motor vehicle), a loudspeaker and a microphone of the hands-free telephone device of the motor vehicle can be switched over from a communication link, which is established by way of the first mobile telephone, to a communication link, which is established by way of the second mobile telephone, in particular by the fact that the hands-free telephone device of the motor vehicle sends a to-hold command to the first mobile telephone by way of the communication interface and/or sends a voice activated command to the second mobile telephone, or vice versa.

An additional further development provides that, when initiated by the user, a loudspeaker and a microphone of the hands-free telephone device of the motor vehicle can be switched simultaneously to a communication link, which is established by way of the first mobile telephone, and to a communication link, which is established by way of the second mobile telephone.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a simplified flow chart of a hands-free telephone device that is configured for a motor vehicle and comprises two mobile telephones.

DETAILED DESCRIPTION OF THE DRAWING

FIG. 1 schematically illustrates a hands-free telephone device FE of a motor vehicle in a vehicle. The hands-free telephone device includes a control unit STE, a memory unit SPE, a microphone MIC, a loudspeaker LS and a Bluetooth transmission device BT.

In addition, the hands-free telephone device FE of the motor vehicle is equipped or coupled with a user interface MMI, which includes a display unit ANZ, such as a graphics display, and an input device EING, such as a switch or a menu control element and a menu item select element. The user interface MMI can also be used to control other vehicular systems. This user interface can be, but does not have to be, an essential component of the hands-free telephone device FE of the motor vehicle.

The hands-free telephone device FE of the motor vehicle, together with the user interface MMI, is actuated by way of the control unit STE, which can be designed as a program controlled processor unit. The control unit STE may be implemented centrally or in a distributed manner; it can be implemented as a part of the user interface MMI and/or of the hands-free telephone device FE of the motor vehicle; and/or it can be implemented separately from the user interface MMI and/or of the hands-free telephone device FE of the motor vehicle. The control unit STE can also be used to control other vehicular systems.

The components of the hands-free telephone device FE of the motor vehicle are connected to each other by way of a databus or analog lines.

Two mobile telephones MT1, MT2 are connected in parallel to the hands-free telephone device FE of the motor vehicle by way of the Bluetooth interface BT.

Each of the mobile telephones MT1, MT2 is also equipped with a Bluetooth interface BT1, BT2 respectively. In addition, each of the mobile telephones MT1, MT2 has an address book memory, which can be designed as a part of a memory unit of a mobile telephone and/or as a part of a memory unit of a subscriber identity module (SIM).

The control unit STE of the hands-free telephone device FE of the motor vehicle and the mobile telephones MT1, MT2 are configured in such a way that directly or indirectly after the connection of the mobile telephones MT1, MT2 with the hands-free telephone device FE of the motor vehicle, the address book entries are transferred automatically (if desired, after a user confirmation) from the address book memory unit of the mobile telephones MT1, MT2 into the memory unit SPE of the hands-free telephone device FE of the motor vehicle by way of the Bluetooth interface BT, BT1, BT2.

The address book entries, originating from the first mobile telephone MT1, are assigned a host mobile telephone ID, which points to the first mobile telephone MT1, in the hands-free telephone device FE of the motor vehicle. The address book entries, originating from the second mobile telephone MT2, are assigned a host mobile telephone ID, which points to the second mobile telephone MT2, in the hands-free telephone device FE of the motor vehicle. In this respect the corresponding host mobile telephone IDs can be transferred to the hands-free telephone device of the motor vehicle in the course of the transfer of the address book entries or can be generated by the hands-free telephone device of the motor vehicle itself.

A combined address book is generated on the basis of the address book entries, originating from the two mobile telephones MT1, MT2 in the hands-free telephone device FE of the motor vehicle; and this combined address book can be sorted and filtered according to a variety of criteria. This combined address book can be displayed on the display ANZ. The individual address book entries can be shown together with the related host mobile telephone ID.

If a user initiates a call setup to a subscriber in that a corresponding address book entry is selected, then the mobile telephone, to which the host mobile telephone ID, assigned to the address book entry, points, is automatically addressed for the call setup.

If a communication link is established by way of both mobile telephones MT1, MT2 respectively, then it is possible for the user to switch via the user interface MMI the hands-free telephone device FE of the motor vehicle, in particular the microphone MIC and the loudspeaker LS, specifically to only one of the two communication links or to both communication links.

A preferred design variant provides that in the event that an address book entry, in particular an address book entry name (for example, the last name), is present in both the first mobile telephone MT1 and also in the second mobile telephone MT2, then either the address book entry is incorporated into the combined address book, this address book entry originating from a preferred mobile telephone, which was selected beforehand by the user; or this address book entry is selected manually by the user after a corresponding input request by means of the hands-free telephone device of the motor vehicle.

Another preferred design variant provides that in the event that an address book entry, in particular an address book entry name (for example, the last name) appears multiple times, it is checked whether the address book entries involve duplicates or not. If it is a case of duplicates, then only one of the address book entries is incorporated. If it is not a case of duplicates, then the address book entries are combined into one "large" address book entry. If, for example, the address book entry "Müller" appears in the SIM card memory and in the mobile telephone memory of a mobile telephone, then the combined list shows only one address book entry. If, for example, the address book entry "Mayer" appears with the office number and the private number and another address book entry "Mayer" appears with the mobile telephone number in the mobile telephone memory, then both address book entries are combined into one address book entry.

Additional preferred design variants provide, analogously to the above described exemplary embodiments, that not only the address book entries of a mobile telephone, but also messages, calendar entries, tasks and/or memos from the mobile telephones may be transferred to the hands-free telephone device of the motor vehicle by way of the communication interface, in order to generate and, if desired, to filter a combined message list, a combined calendar, a combined to-do list, and/or a common memo list.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hands-free telephone device of a motor vehicle, comprising:
    a communication interface operatively configured to connect at least first and second mobile telephones to the hands-free telephone device of the motor vehicle;
    a control unit operatively configured to control a transfer of mobile telephone address book entries from the first and second mobile telephones to the hands-free telephone device of the motor vehicle via the communication interface; and
    a common address book configured by the hands-free telephone device of the motor vehicle, the common address book containing entries generated based on the mobile telephone address book entries from the first and second mobile telephones, wherein each of mobile telephone address book entries received from the first and second mobile telephones is assigned an identity tag received from and identifying a corresponding one of the first and second mobile telephones from which each such entry originated, and wherein the identity tag identifying said corresponding one of the first and second mobile telephones is stored together with each of the corresponding mobile telephone address book entries in a memory unit of the hands-free telephone device of the motor vehicle.

2. The hands-free telephone device of the motor vehicle according to claim 1, wherein at least one of:
    the common address book of the hands-free telephone device of the motor vehicle is stored in the memory unit of the hands-free telephone device of the motor vehicle; and
    the common address book of the hands-free telephone device of the motor vehicle is at least partially output to a display unit operatively coupled to the hands-free telephone device of the motor vehicle.

3. The hands-free telephone device of the motor vehicle, according to claim 1, wherein the control unit is operatively configured to jointly sort or filter the mobile telephone address book entries of the common address book of the hands-free telephone device of the motor vehicle.

4. The hands-free telephone device of the motor vehicle according to claim 1, further comprising:
    at least one of messages, calendar entries, tasks, and memos transferred from the first and second mobile telephones to the hands-free telephone device of the motor vehicle via the communication interface; and
    wherein the at least one of the messages, calendar entries, tasks, and memos are respectively provided in the hands-free telephone device of the motor vehicle as a common message list, a common calendar, a common task list, and a common memo list.

5. The hands-free telephone device of the motor vehicle according to claim 1, further comprising:
    an input unit assigned to the hands-free telephone device of the motor vehicle; and
    wherein the control unit is operatively configured to carry out a call setup based on a selection of an address book entry from the common address book via the input unit automatically using the mobile telephone having the identity tag assigned to the selected address book entry.

6. The hands-free telephone device of the motor vehicle according to claim 1, further comprising:
    a loudspeaker of the hands-free telephone device of the motor vehicle;
    a microphone of the hands-free telephone device of the motor vehicle;
    wherein the control unit is operatively configured to switch the loudspeaker and the microphone from a communication link established via the first mobile telephone to a communication link established via the second mobile telephone upon initiation by a user.

7. The hands-free telephone device of the motor vehicle according to claim 1, further comprising:
    a loudspeaker of the hands-free telephone device of the motor vehicle;
    a microphone of the hands-free telephone device of the motor vehicle; and wherein the control unit is operatively configured to switch the loudspeaker and the microphone simultaneously to a communication link established via the first mobile telephone and to a communication link established via the second mobile telephone upon initiation by a user.

8. The hands-free telephone device of the motor vehicle according to claim 1, wherein the communication interface is operatively configured to connect the first and second mobile telephones to the hands-free telephone device in parallel.

9. A method of operating a hands-free telephone device of a motor vehicle, the method comprising the acts of:
receiving mobile telephone address book entries from a first mobile telephone and mobile telephone address book entries from a second mobile telephone in the hands-free telephone device of the motor vehicle via a communication interface controlled by a control unit, the communication interface being configured to connect the first and second mobile telephones to the hands-free telephone device of the motor vehicle;
receiving identity tags assigned to each of the mobile telephone address book entries, wherein such identity tags are received from and identify a corresponding one of the first and second mobile telephones from which each such entry originated;
generating a common address book in the hands-free telephone device of the motor vehicle based on the mobile telephone address book entries from the first and second mobile telephones; and
storing the identity tags identifying said corresponding one of the first and second mobile telephone with corresponding ones of the address book entries of the common address book in a memory unit of the hands-free telephone device of the motor vehicle.

10. The method according to claim 9, further comprising the act of:
storing the common address book in the memory unit of the hands-free telephone device.

11. The method according to claim 10, further comprising the act of:
outputting at least a portion of the common address book to a display unit operatively coupled to the hands-free telephone device.

12. The method according to claim 11, further comprising outputting the identity tag together with the corresponding address book entries to the display unit coupled with the hands-free telephone device of the motor vehicle.

13. The method according to claim 12, further comprising the act of:
automatically initiating a call set-up, based on a selection of an address book entry via an input unit coupled with the hands-free telephone device, via a respective mobile telephone having the identity tag assigned to the selected address book entry.

14. The method according to claim 9, further comprising the act of:
outputting at least a portion of the common address book to a display unit operatively coupled to the hands-free telephone device.

* * * * *